(12) United States Patent
Kaminsky et al.

(10) Patent No.: US 10,255,373 B2
(45) Date of Patent: Apr. 9, 2019

(54) NORMALIZING A PAGE FLOW

(71) Applicant: INTERNATIONAL BUSINESS MACHINES CORPORATION, Armonk, NY (US)

(72) Inventors: David L. Kaminsky, Chapel Hill, NC (US); Ying Liu, Beijing (CN); Shuangtao Lv, Anyang (CN); Xi Ning Wang, Beijing (CN); Rui Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 37 days.

(21) Appl. No.: 14/286,462

(22) Filed: May 23, 2014

(65) Prior Publication Data

US 2015/0007006 A1    Jan. 1, 2015

(30) Foreign Application Priority Data

Jun. 27, 2013 (CN) .......................... 2013 1 0261024

(51) Int. Cl.
*G06F 17/00* (2006.01)
*G06F 17/30* (2006.01)
(52) U.S. Cl.
CPC .............................. *G06F 17/3089* (2013.01)
(58) Field of Classification Search
CPC ........... G06F 17/2235; G06F 17/30873; G06F 17/30893; G06F 17/3089
USPC ................................................ 715/205, 255
See application file for complete search history.

(56) References Cited

U.S. PATENT DOCUMENTS

| 7,240,280 | B2 * | 7/2007 | Jolley ............... G06F 17/30581 |
| | | | 707/E17.032 |
| 7,266,806 | B2 * | 9/2007 | Choi ......................... G06F 8/24 |
| | | | 717/107 |
| 7,493,564 | B2 | 2/2009 | Swanson et al. |
| 7,496,855 | B2 * | 2/2009 | Guido ................... G06F 3/0485 |
| | | | 715/784 |

(Continued)

FOREIGN PATENT DOCUMENTS

| CN | 1956445 A | 5/2007 |
| CN | 101228521 A | 7/2008 |

(Continued)

OTHER PUBLICATIONS

Balsoy et al., The Online Knowledge Center: Building a Component Based Portal, Citeseer 2002, 1-6.*

(Continued)

*Primary Examiner* — Cong-Lac Huynh
(74) *Attorney, Agent, or Firm* — Law Office of Jim Boice

(57) ABSTRACT

A method and/or an apparatus normalizes a page flow into a portlet. The method comprises: generating at least one portlet based on one or more pages in the page flow; building at least one of an intra-portlet action and an inter-portlet action for the least one portlet; and modifying a Uniform Resource Locator URL in the at least one portlet. With the method and the apparatus, the page flow developed by a developer can be automatically normalized into the portlet which is easier to be shared between difference applications and integrated with an existing portal application, so that the developer can focus on development of page flow while achieving user experience and advantages specific to the portlet.

15 Claims, 8 Drawing Sheets

(56) References Cited

U.S. PATENT DOCUMENTS

| | | | |
|---|---|---|---|
| 7,500,181 B2* | 3/2009 | Kim | G06F 17/30899 707/999.01 |
| 7,661,061 B2* | 2/2010 | Joshi | G06F 8/20 715/200 |
| 7,752,677 B2 | 7/2010 | Musson et al. | |
| 7,890,885 B2* | 2/2011 | Muller | G06F 9/4443 715/760 |
| 7,996,494 B2 | 8/2011 | Allamaraju et al. | |
| 8,365,271 B2 | 1/2013 | Blum et al. | |
| 9,342,613 B2* | 5/2016 | Arthurs | G06F 17/3089 |
| 9,703,880 B2* | 7/2017 | Liesche | G06F 17/30873 |
| 2003/0167315 A1* | 9/2003 | Chowdhry | G06F 17/30873 709/218 |
| 2004/0090969 A1* | 5/2004 | Jerrard-Dunne | G06F 17/30873 370/395.54 |
| 2004/0098467 A1* | 5/2004 | Dewey | G06F 17/30873 709/219 |
| 2004/0107404 A1* | 6/2004 | Burns | G06F 17/30896 715/273 |
| 2004/0107423 A1* | 6/2004 | Noda | G06F 17/3089 719/311 |
| 2004/0133660 A1* | 7/2004 | Junghuber | G06F 17/3089 709/219 |
| 2004/0183831 A1* | 9/2004 | Ritchy | G06F 17/3089 715/762 |
| 2004/0199541 A1* | 10/2004 | Goldberg | G06Q 10/06 |
| 2004/0225995 A1* | 11/2004 | Marvin | G06F 8/41 717/100 |
| 2005/0166188 A1 | 7/2005 | Secrist et al. | |
| 2005/0256808 A1* | 11/2005 | Allamaraju | G06F 21/335 705/67 |
| 2005/0257227 A1* | 11/2005 | Ritchy | G06F 9/4443 719/328 |
| 2006/0004913 A1* | 1/2006 | Chong | G06F 17/3089 709/217 |
| 2006/0010390 A1 | 1/2006 | Guido et al. | |
| 2006/0015571 A1* | 1/2006 | Fukuda | H04L 67/20 709/217 |
| 2006/0036954 A1* | 2/2006 | Satyadas | G06Q 10/06 715/742 |
| 2006/0080612 A1* | 4/2006 | Hayes, Jr. | G06F 17/30905 715/742 |
| 2006/0277199 A1* | 12/2006 | Joret | G06F 17/3089 |
| 2007/0006075 A1* | 1/2007 | Lection | G06F 17/3089 715/234 |
| 2007/0006318 A1* | 1/2007 | Allamaraju | H04L 67/02 726/27 |
| 2007/0061707 A1* | 3/2007 | Sally | G06F 17/3089 715/210 |
| 2007/0113201 A1* | 5/2007 | Bales | G06F 8/38 715/810 |
| 2007/0124506 A1* | 5/2007 | Brown | G06F 17/30873 709/252 |
| 2007/0136329 A1* | 6/2007 | Kussmaul | G06F 17/3089 |
| 2007/0136415 A1* | 6/2007 | Behl | G06F 17/30873 709/203 |
| 2007/0209006 A1* | 9/2007 | Arthurs | G06F 17/3089 715/733 |
| 2007/0283271 A1* | 12/2007 | Lection | G06F 3/04817 715/733 |
| 2008/0046449 A1* | 2/2008 | Lee | G06F 17/30902 |
| 2008/0172488 A1* | 7/2008 | Jawahar | G06F 17/30902 709/225 |
| 2008/0183720 A1* | 7/2008 | Brown | G06F 17/30873 |
| 2009/0044099 A1* | 2/2009 | Chakravarthy | G06F 17/3089 715/234 |
| 2009/0157633 A1* | 6/2009 | Lee | G06F 17/30899 |
| 2010/0070847 A1* | 3/2010 | Hampton | G06F 17/3089 715/234 |
| 2010/0070929 A1* | 3/2010 | Behl | G06F 17/30876 715/854 |
| 2010/0115432 A1* | 5/2010 | Arthurs | G06F 17/3089 715/760 |
| 2010/0138734 A1* | 6/2010 | Braud | G06Q 10/06 715/227 |
| 2010/0211559 A1* | 8/2010 | de Morentin Martinez | G06F 17/30864 707/707 |
| 2011/0054966 A1* | 3/2011 | Goldberg | G06Q 10/06 705/7.11 |
| 2012/0174062 A1* | 7/2012 | Choi | G06F 8/24 717/108 |
| 2012/0179494 A1 | 7/2012 | He et al. | |
| 2013/0091115 A1* | 4/2013 | Brake | G06F 17/30864 707/708 |
| 2013/0246908 A1* | 9/2013 | Buehler | G06F 17/2247 715/234 |
| 2013/0326046 A1* | 12/2013 | Chan | G06F 9/4443 709/224 |
| 2013/0326333 A1* | 12/2013 | Hashmi | G06F 17/2247 715/234 |
| 2014/0149283 A1* | 5/2014 | Roselli | G06Q 20/10 705/39 |
| 2015/0309993 A1* | 10/2015 | Wilde | H04L 67/02 715/703 |

FOREIGN PATENT DOCUMENTS

| | | |
|---|---|---|
| CN | 102662993 A | 9/2012 |
| WO | 2004031986 A1 | 4/2004 |

OTHER PUBLICATIONS

Deora et al., Navigating Provenance Information for Distributed Healthcare Management, IEEE 2006, pp. 1-7.*

Diaz et al., Improving Portlet Interoperability through Deep Annotation, ACM 2005, pp. 372-381.*

Baker et al., Application Reuse through Portal Frameworks, Google Scholar 2002, pp. 1-8.*

Oracle, "58: Creating Portlets With the Oracle JSF Portlet Bridge", Oracle, Oracle Fusion Middleware Developer's Guide for Oracle Webcenter, 11g Release 1 (11.1.1.5.0), Retrieved May 22, 2014, pp. 1-13.

F. Bellas et al.,"An Automatic Approach to Displaying Web Applications As Portlets", Springer, Distributed Computing and Internet Technology, Lecture Notes in Computer Science, vol. 4317, 2006, pp. 264-277.

F. Bellas et al., "New Approches to Portletization of Web Applications", IGI Global, Handbook of Research on Web Information Systems Quality, 2008, pp. 250-265.

B. Mada, "Integrating the Web Application Bridge (WAB) With IBM Websphere Portal 8.0: A Step-By-Step Guide", IBM, Community Articles, Last Edited October 24, 2012, pp. 1-9.

* cited by examiner

FIG. 3

```
<event-definition>
    <name>PaymentHistoryEvent</name>
    <value-type>java.lang.String</value-type>
</event-definition>
<produceIntraEvent>
    <event-definition>PaymentHistoryEvent</event-definition>
    <event-instance>{"eventId":"event24626611298"}</event-instance>
</produceIntraEvent>
<receiveIntraEvent>
    <event-instance>{"eventId":"event24626611298"}</event-instance>
</receiveIntraEvent>
```

FIG. 4B

```
<event-definition>
    <name>PaymentApprovalDetailEvent</name>
    <value-type>java.lang.String</value-type>
</event-definition>
<produceInterEvent>
    <event-definition>PaymentApprovalDetailEvent</event-definition>
    <event-instance>{"eventId":"event24626611452","paymentId":"1316754254439"}</event-instance>
</produceInterEvent>
<receiveInterEvent>
    <event-instance>{"eventId":"event24626611452"}</event-instance>
</receiveInterEvent>
```

FIG. 4C

NORMALIZING A PAGE FLOW

BACKGROUND

The present invention relates to a page flow, and more specifically, to a method and apparatus for normalizing a page flow into a portlet.

A page flow is a flow consisting of one or more pages (or webpages) which are linked together through navigation control to execute a specific business logic. The page flow allows to separate codes of the pages per se (i.e., user interface codes) from codes for the navigation control among the respective pages (i.e., navigation control codes), so that the user interface codes can be placed in any proper position in a JSP file, and the navigation control codes can be placed in a separate control file. In this way, the user interface codes and the navigation control codes may be developed by different persons, thereby achieving better development efficiency and effects. However, it is not easy for the page flow to be shared between different applications or integrated with an existing page flow.

Portlets are pluggable user interface components, and are managed and displayed by a portlet container. A plurality of portlets can be mashed up in one page to implement customization of the page. These portlets can communicate with each other, and use events to determine a user's operation path through a web application. The portlets further have the following characteristics: a single portlet can have multiple instances, in other words, the single portlet can appear on different pages within a single portal, or can appear on pages across multiple portals; the portlets are customizable, that is, they can be customized to meet demands of users; and the portlets constituting the page may be rendered to support a navigation state path by making URLs of the portlets contain navigation state information, i.e., state information about the page and all the portlets on the page. The above characteristics of the portlets render that the portlets have advantages of being easy to be shared between different applications, being easy to be integrated with an existing portal application, and the like.

SUMMARY

An object of the present invention is to provide a method and an apparatus for normalizing a page flow into a portlet, which can automatically normalize a page flow developed by a developer into a portlet easy to be shared between difference applications and integrated with an existing portal application, thereby achieving user experience and advantages specific to the portlet.

According to an aspect of the present invention, there is provided a method and/or computer program product for normalizing a page flow into a portlet, the method comprising: generating at least one portlet based on one or more pages in the page flow; building at least one of an intra-portlet action and an inter-portlet action for the least one portlet; and modifying a Uniform Resource Locator (URL) in the at least one portlet.

According to another aspect of the present invention, there is provided an apparatus for normalizing a page flow into a portlet, the apparatus comprising: a portlet generating device configured to generate at least one portlet based on one or more pages in the page flow; an action building device configured to build at least one of an intra-portlet action and an inter-portlet action for the at least one portlet; and a URL modifying device configured to modify a URL in the at least one portlet.

With the method and/or computer program product and/or apparatus according to the above aspects of the present invention, the page flow developed by the developer may be automatically normalized into a portlet which is easy to be shared between difference applications and integrated with an existing portal application, so that the developer can focus on development of a page flow application while achieving user experience and advantages specific to the portlet.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 3 shows an example of metadata of the page flow.

FIG. 4B shows a code segment example of an event for the intra-portlet action built for the example shown in FIG. 4A.

FIG. 4C shows a code segment example of an event for the inter-portlet action built for the example shown in FIG. 4A.

DETAILED DESCRIPTION

Figure 1:
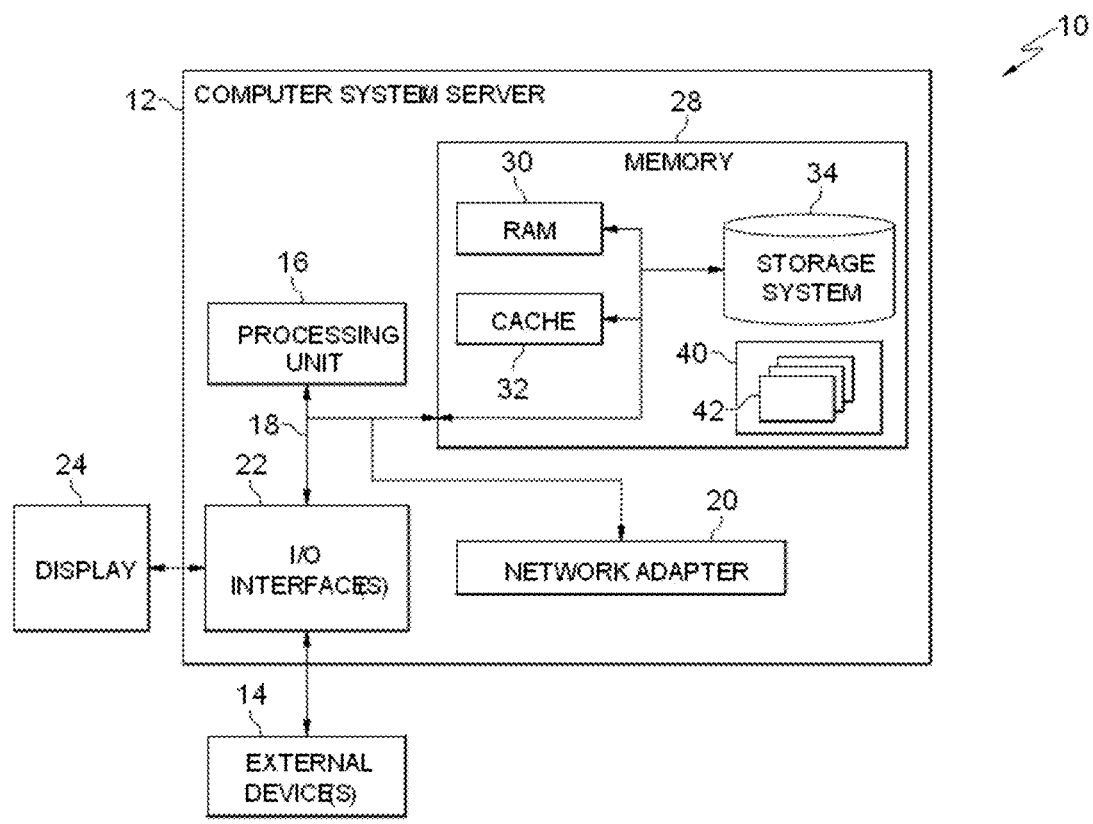
FIG. 1 shows a block diagram of an exemplary computer system/server 12 which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. Rather, those embodiments are provided for the thorough and complete understanding of the present disclosure, and completely conveying the scope of the present disclosure to those skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The method and the apparatus for normalizing a page flow into a portlet according to the embodiments of the present invention will be described below with reference to accompany drawings. As described above, the page flow may include one or more pages that are linked together in sequence through navigation control among them.

Firstly, the method for normalizing a page flow into a portlet according to the embodiment of the present invention is described with reference to FIG. 2. In the embodiment of the present invention, in order to normalize the page flow into the portlet, it is firstly required to generate the portlet based on the respective pages of the page flow, and then to normalize the generated portlet according to characteristics of the page flow.

Figure 2:
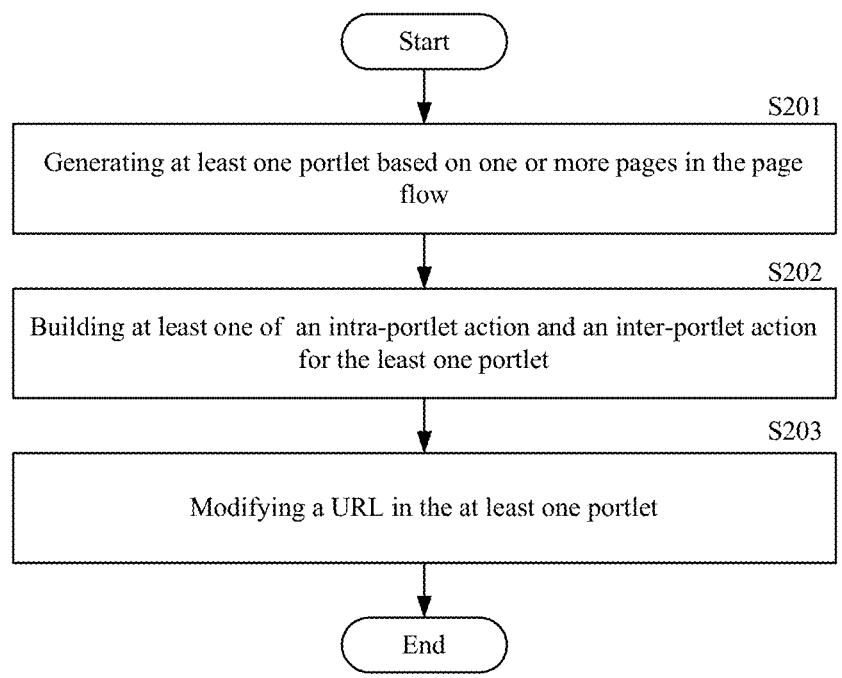
FIG. 2 is a flow chart showing a method for normalizing a page flow into a portlet according to an embodiment of the present invention.

As shown in FIG. 2, in step S201, at least one portlet is generated based on one or more pages in the page flow.

Because the page flow includes one or more pages, one or more portlets can be generated based on these pages. In addition, as mentioned above, one portlet may include one or more pages. Thus, when the at least one portlet is generated based on the one or more pages in the page flow, it is firstly necessary to determine a page(s), which is to be generated into each portlet, in the one or more pages, that is, determine which pages are to be generated into a same portlet, and which pages are to be generated into different portlets, so that it is possible to determine how many portlets are generated based on the one or more pages.

The page(s), which is to be generated into each portlet, in the one or more pages can be determined according to a preset rule. The rule may be any proper rule selected according to practical needs, and can be applied to all types of page flows.

Figure 3:
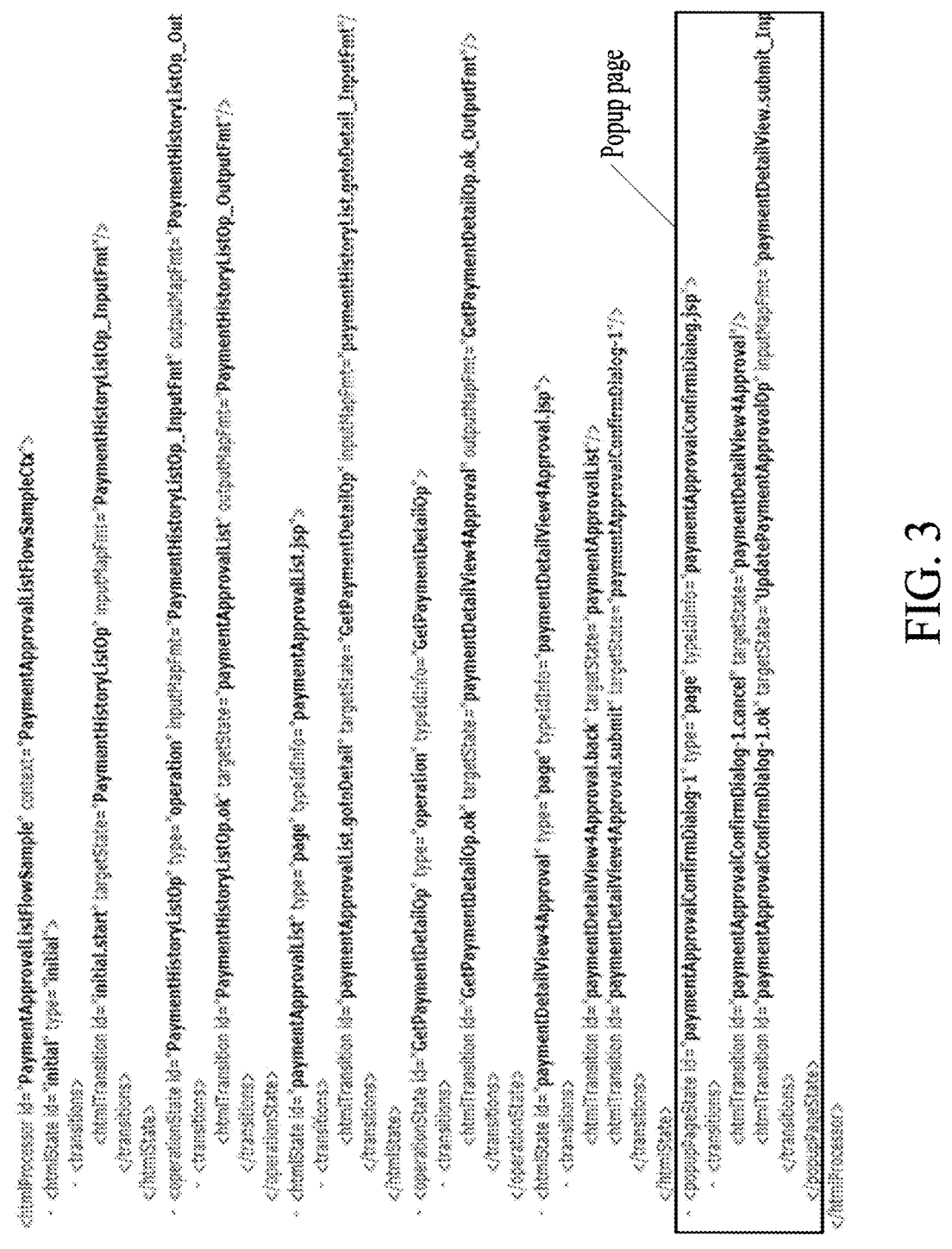

For example, the rule may be a type of a page to which the page is linked. Specifically, if one page in the one or more pages is linked to another independent page (i.e. the another independent page can be displayed independently of the one page without overlaying or replacing it), it can be determined that the one page and the another independent page are generated into two portlets. On the other hand, if one page in the one or more pages is linked to another page for overlaying the one page (i.e. the another page will replace the one page), it can be determined that the one page and the another page are generated into a same portlet. In this case, the type of the page to which each page is linked can be determined by extracting and analyzing metadata of the page flow. As known in the art, the metadata of the page flow describes properties of respective pages per se in the page flow, linking or jumping relationship among the respective pages, and the like, thus the type of the page to which each page is linked can be known from the metadata. For example, if it is determined by analyzing the metadata that a page is linked to a popup page, as shown in FIG. 3, which will overlay this page, it can be determined that this page and the popup page are generated into a same portlet. As another example, if it is determined by analyzing the metadata that a page contains a table, and a certain column of the table is linked to another independent page, it can be determined that this page and the another independent page are generated into two portlets.

In addition to the preset rule applied to all page flows, the user can also customize a particular rule, so that for some page flows, a page(s) to be generated into each portlet can be determined based on the particular rule. Alternatively, the page(s) to be generated into each portlet, which is determined based on the preset rule, may be selected/adjusted according to the user-customized rule. The user can customize the rule freely according to actual needs.

After the page(s) to be generated into each portlet is determined, the at least one portlet can be generated based on all these pages. Specifically, codes describing these pages can be generated in a format conforming to a portlet specification. The method for generating the portlet based on the pages is well known in the art, and a detailed description thereof is omitted here for simplicity.

Returning to FIG. 2, in step S202, at least one of an intra-portlet action and an inter-portlet action is build for the at least one portlet.

As described above, the respective pages in the page flow are linked together through the navigation control, and accordingly, the linking relationship among the respective pages need to be reflected in the generated portlet. In the embodiment of the present invention, the linking relationship can be reflected by building at least one of the intra-portlet action and the inter-portlet action. Specifically, for two or more pages generated into a same portlet, the intra-portlet action can be built based on the linking relationship among these pages, and for a plurality of pages included in a plurality of portlets respectively, the inter-portlet action can be built based on the linking relationship among these pages.

The intra-portlet action and/or the inter-portlet action may be built by defining events indicating the action(s). Hereinafter, a method for building the action(s) is exemplarily described with reference to FIGS. 4A-4C.

Figure 4A:
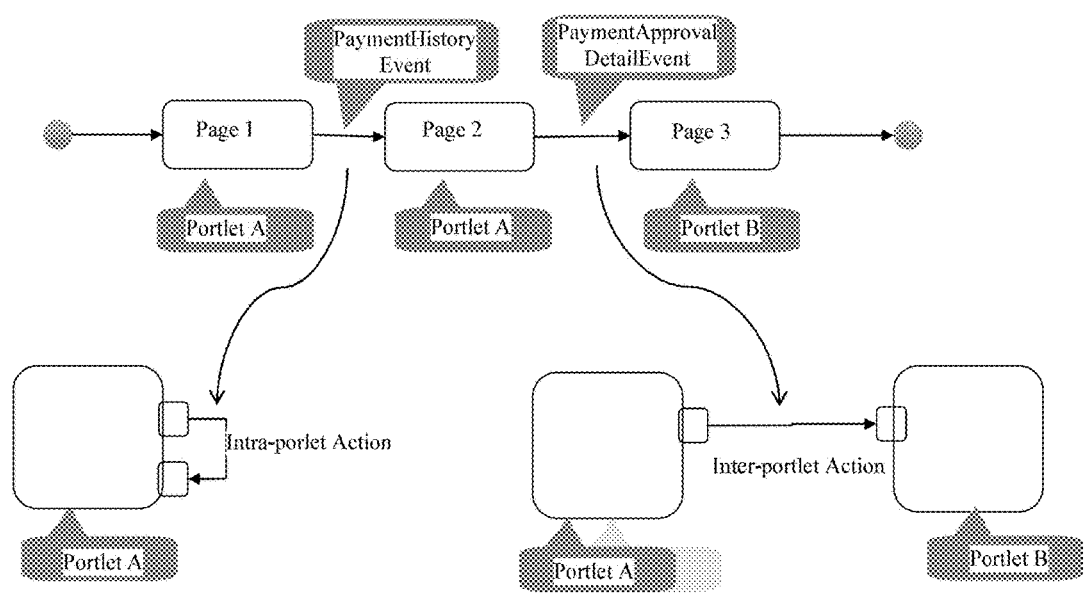
FIG. 4A shows an example of building an intra-portlet action and an inter-portlet action.

As shown in FIG. 4A, assume that a page flow includes three pages 1-3, where page 1 and page 2 are linked by an event "PayementHistoryEvent", that is, when the event is triggered, a jump from page 1 to page 2 is performed, and page 2 and page 3 are linked by an event "PaymentApprovalDetailEvent", that is, when the event is triggered, a jump from page 2 to page 3 is performed. Assume that when portlets are generated based on pages 1-3, pages 1 and 2 are generated into a portlet A, and page 3 is generated into a portlet B. In this case, the event "PayementHistoryEvent" corresponds to an action within the portlet A, and the event "PaymentApprovalDetailEvent" corresponds to an action between the portlet A and the portlet B. In other words, it is necessary to build the action within the portlet A to reflect the event "PayementHistoryEvent" and build the action between the portlet A and the portlet B to reflect the event "PaymentApprovalDetailEvent". As described above, the actions may be built by defining events indicating the corresponding actions. FIG. 4B shows an example of codes for the event indicating the action within the portlet A, which reflects the event "PayementHistoryEvent", and indicates specific content of the action by "eventID: event24626611298". FIG. 4C shows an example of codes for the event indicating the action between the portlet A and the portlet B, which reflects the event "PaymentApprovalDetailEvent", and indicates specific content of the action by "eventID: event24626611452".

Returning to FIG. 2, in step S203, a uniform resource locator (URL) in the at least one portlet is modified.

Figure 5:
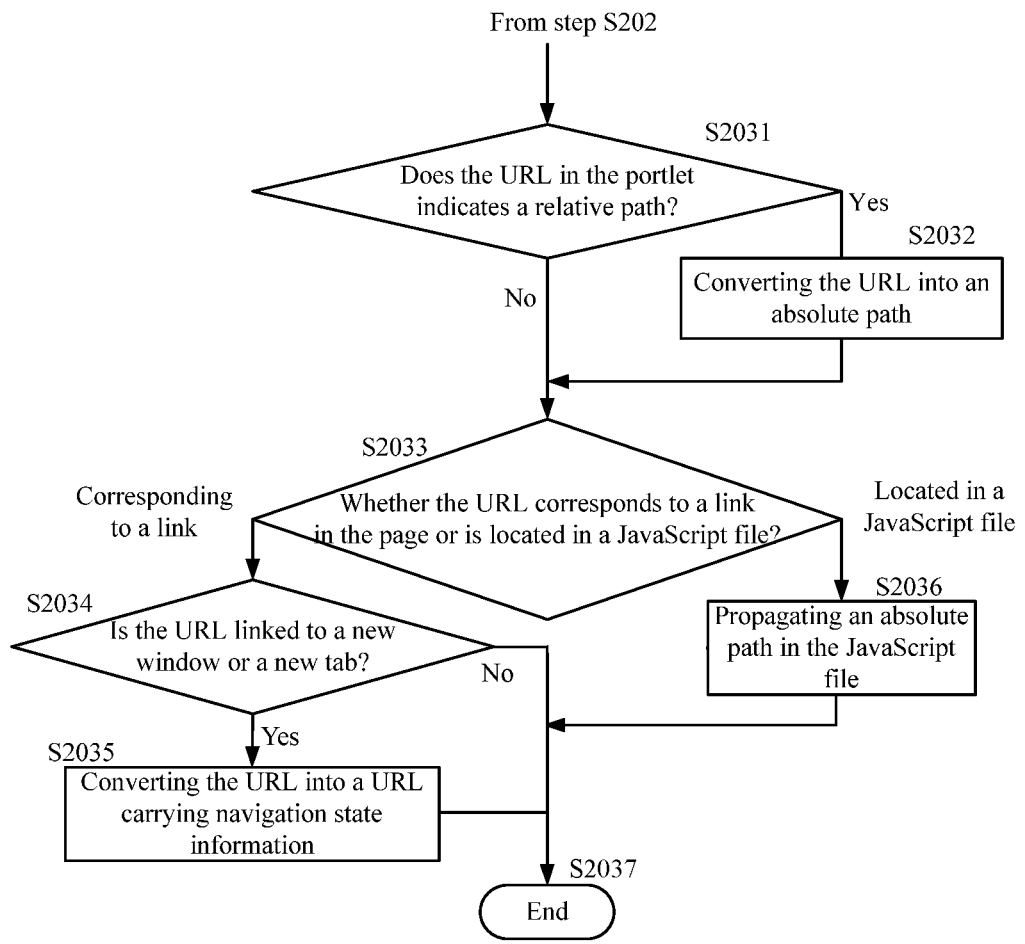
FIG. 5 schematically shows detailed operation of step S203 shown in FIG. 2.

Specifically, after generation of the portlet as described above, it is further necessary to ensure that the URL in the portlet conforms to the portlet specification. For example, a URL for a link in a page should indicate an absolute path of the link, and should carry navigation state information so as to ensure a proper deployment and operation of the portlet. Therefore, according to a specific state of the generated portlet, it may be necessary to modify the URL for the link in the portlet. For example, when the URL indicates a relative path of a link in the portlet, the URL may be converted into a URL indicating the absolute path of the link, and then, based on a type of the converted URL, the URL for the link in the at least one portlet is modified. When the URL indicates an absolute path of the link, the URL of the link in the at least one portlet can be modified directly based on the type of the URL. Specifically, if the URL corresponds to a link in the page, and an object of the link is a new window or a new tab, the URL can be converted into a URL carrying the navigation state information. In addition, if the URL is located in a JavaScript file, a URL indicating a relative path in the JavaScript file may be converted into a URL indicating an absolute path, so as to achieve normalization of the URL. FIG. 5 shows an exemplary manner of modifying the URL in the at least one portlet in step S203. As shown in FIG. 5, in step S2031, it is determined whether the URL for the link in the portlet indicates the relative path of the portlet. If yes, in step S2032, the URL is converted into the URL indicating the absolute path of the link in the portlet. Specifically, a root path of the link in the portlet can be attached to the URL so that the relative path indicated by the URL is converted into the absolute path. As known in the art, the root path can be obtained by analyzing a context of the portlet. For example, for the URL indicating the relative path "<a href="servlet/account?id=1003235458344">Detail</a>", the root path "<%=PORTLET_CONTEXT%>" can be attached to the URL to convert it into the URL indicating the absolute path of links in the portlet "<a href="<%=PORTLET_CONTEXT%>/servlet/account?id=1003235458344" etail</a>".

After completion of the conversion of the URL in step S2032, or if it is determined in step S2031 that the URL in the portlet does not indicate the relative path of the portlet, and instead indicates the absolute path of the portlet, in step S2033, it is determined whether the URL (or the converted URL) corresponds to a link in the page or is located in a JavaScript file. As known in the art, the portlet may contain the JavaScript file, thus the URL in the portlet may be located in the JavaScript file, or may be located at other positions in the portlet and indicate the link in the page. Such a determination can be conducted by analyzing the context of the portlet, for example, a parent node of the URL. It is to be noted that because the page may contain a CSS file, when the URL in the portlet is located in the CSS file and corresponds to a link, it can be considered that the URL corresponds to the link in the page.

When it is determined in step S2033 that the URL corresponds to the link in the page, it is determined in step S2034 whether the URL is linked to a new window or a new tab. If not, the URL need not be processed (converted), and the process ends at terminator block S2037. On the contrary, if the URL is linked to the new window or the new tab, in step S2035, the URL is converted into a URL carrying the navigation state information. As known in the art, the navigation state information is information describing a layout of a page where the portlet is currently located, a window status of the portlet (normal, minimized, or maximized) and rendering parameters, and the like. The URL can be converted into the URL carrying the navigation state information in a manner known in the art; for example, the URL can be converted into the URL carrying the navigation state information by using a service in a navigation state system programming interface (SPI) which an existing portlet engine usually provides, and a detailed description thereof is omitted here for simplicity.

When it is determined in step S2033 that the URL is in the JavaScript file, in step S2036, all URLs indicating relative paths in the JavaScript file are converted into URLs indicating absolute paths, that is, the absolute paths are propagated into related JavaScript variables in the JavaScript file so that the variables conform to the portlet specification. Such conversion can be carried out in the above-described manner. Furthermore, optionally, the converted URLs in the JavaScript file can be further converted into URLs carrying navigation state information in the above-described manner.

By performing the above operations, the normalized portlet can be generated based on the pages of the page flow, so as to normalize the page flow into the portlet.

Hereinafter, the apparatus for normalizing a page flow into a portlet according to the embodiment of the specification is described with reference to FIG. 6. The apparatus can execute the method for normalizing a page flow into a portlet according to the embodiment of the specification in the above-described manner. Since details thereof have been described previously, only a brief description of the apparatus is given below to avoid repetition.

Figure 6:
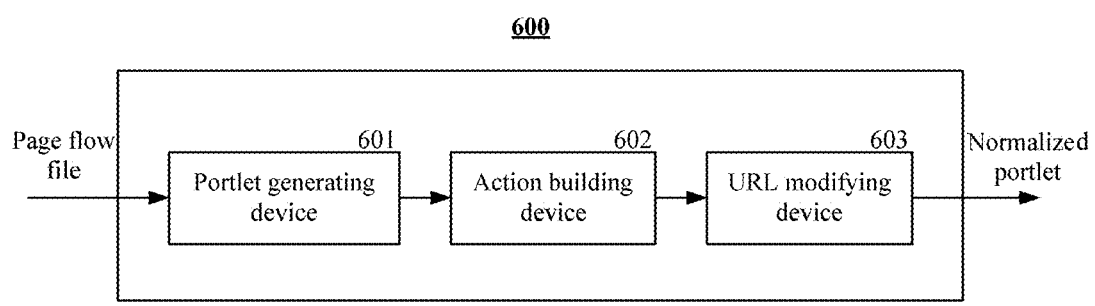
FIG. 6 shows a block diagram of an apparatus for normalizing a page flow into a portlet according to an embodiment of the present invention.

As shown in FIG. 6, the apparatus 600 comprises a portlet generating device 601, an action building device 602 and a URL modifying device 603.

Figure 7:
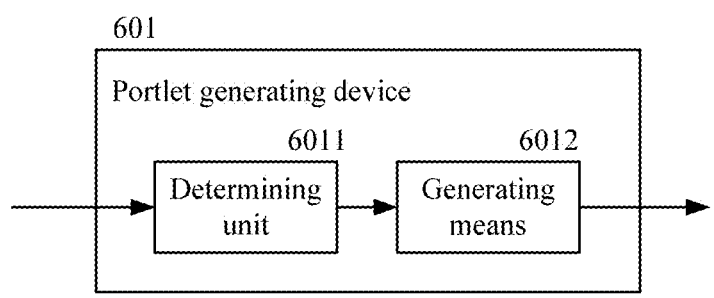
FIG. 7 is a block diagram showing an exemplary structure of a portlet generating device shown in FIG. 6.

The portlet generating device 601 receives a page flow file developed by a developer, and generates at least one portlet based on one or more pages in the page flow. FIG. 7 shows an exemplary structure of the portlet generating device 601. As shown in FIG. 7, the portlet generating device 601 may include a determining unit 6011 and a generating unit 6012.

The determining unit 6011 determines a page(s), which is to be generated into each portlet, in the one or more pages. The determining unit 6011 can determine the page(s), which is to be generated into each portlet, in the plurality of pages according to a preset rule. The rule can be any proper rule selected according to practical needs. As described above, the rule may be, for example, a type of a page to which the page is linked. Specifically, if one page in the one or more pages is linked to another independent page (i.e. the another independent page can be displayed independently of the one page without overlaying or replacing it), the determining unit 6011 can determine that the one page and the another independent page are generated into two portlets; on the other hand, if one page in the one or more pages is linked to another page for overlaying the one page (i.e. the another page will replace the one page), the determining unit 6011 can determine that the one page and the another page are generated into a same portlet. The determining unit 6011 can determine the type of the page to which each page is linked by extracting and analyzing metadata of the page flow. In addition to the preset rule, the user can also customize a particular rule so that for some page flows, the determining unit 6011 can determine the page(s) to be generated into each portlet based on the particular rule, or select/adjust, in accordance with the user-customized rule, the page(s) to be generated into each portlet that are determined based on the preset rule.

The generating unit 6012 generates the at least one portlet based on the determined page(s) to be generated into each portlet. The generating unit 6012 can generate the portlet based on the page(s) by using a method known in the art, and a detailed description thereof is omitted here for simplicity.

Returning to FIG. 6, the action building device 602 builds at least one of an intra-portlet action and an inter-portlet action for the at least one portlet. For example, for two or more pages generated into a same portlet, the action building device 602 can build the intra-portlet action based on linking relationship among these pages, and for a plurality of pages included in a plurality of portlets respectively, the action building device 602 can build an inter-portlet action based on linking relationship among these pages.

Figure 8:
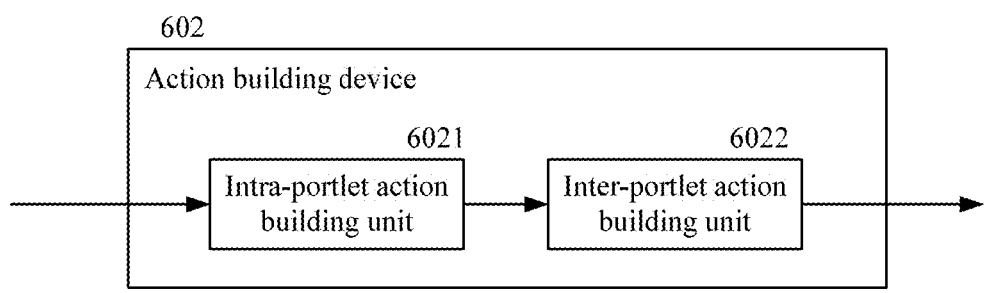
FIG. 8 is a block diagram showing an exemplary structure of an action building device shown in FIG. 6.

FIG. 8 shows an exemplary structure of the action building device 602. As shown in FIG. 8, the action building device 602 may include an intra-portlet action building unit 6021 and an inter-portlet action building unit 6022. The intra-portlet action building unit 6021 can build the intra-portlet action based on the linking relationship among the pages included in one portlet. The inter-portlet action building unit 6022 can build the inter-portlet action based on the linking relationship among the pages included in the plurality of portlets respectively. As described above, the intra-portlet action building unit 6021 and the inter-portlet action building unit 6022 may build the intra-portlet action and the inter-portlet action by defining events indicating the actions, respectively.

Returning to FIG. 6, the URL modifying device 603 modifies a URL in the at least one portlet. Specifically, after generation of the portlet as described above, it is necessary to ensure that the URL in the portlet conforms to the portlet specification, in addition to building the intra-portlet action and inter-portlet action to reflect the linking relationship among the pages of the page flow. Therefore, the URL modifying device 603 can modify the URL in the portlet if necessary.

Figure 9:
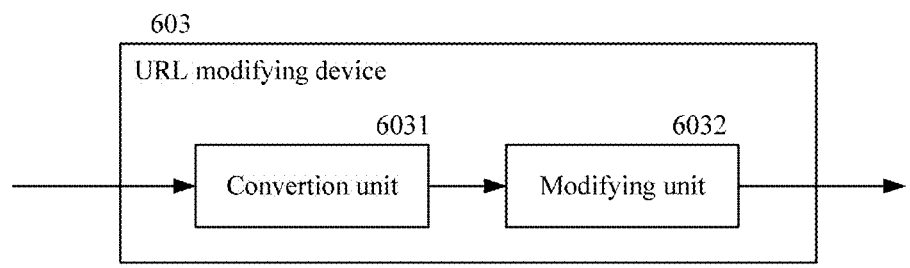
FIG. 9 is a block diagram showing an exemplary structure of a URL modifying device shown in FIG. 6.

FIG. 9 shows an exemplary structure of the URL modifying device 603. As shown in FIG. 9, the URL modifying device 603 may include a conversion unit 6031 and a modifying unit 6032.

When the URL indicates a relative path in the portlet, the conversion unit 6031 converts the URL into a URL indicating an absolute path. Specifically, the conversion unit 6031 can attach a root path to the URL so that the relative path indicated by the URL can be converted into the absolute path. As known in the art, the conversion unit 6031 can obtain the root path by analyzing a context of the portlet. Then, the modifying unit 6032 can modify the URL in the at least one portlet according to a type of the URL (i.e., the converted URL). Specifically, when the URL corresponds to a link in the page, and an object of the link is a new window or a new tab, the modifying unit 6032 converts the URL into a URL carrying navigation state information. In this case, the modifying unit 6032 can convert the URL into the URL carrying the navigation state information in a manner known in the art, for example, by using a service in a navigational state system programming interface (SPI) which an existing portlet engine usually provides, and a detailed description thereof is omitted here for simplicity. On the other hand, if the URL is located in a JavaScript file, the modifying unit 6032 converts a URL indicating a relative path in the JavaScript file into a URL indicating an absolute path, so as to propagate the absolute path into all related variables in the file. Furthermore, optionally the modifying unit can further convert the converted URL in the file into a URL carrying navigation state information.

When the URL indicates the absolute path in the portlet, it is not necessary to perform the conversion by the conversion unit 6031, and the modifying unit 6032 can modify the URL in the at least one portlet directly in the above-described manner based on the type of the URL. Specifically, if the URL corresponds to the link in the page, and an object of the link is a new window or a new tab, the modifying unit 6032 can convert the URL into the URL carrying the navigation state information, and if the URL is located in a JavaScript file, the modifying unit 6032 can convert a URL indicating a relative path in the JavaScript file into a URL indicating an absolute path, and optionally further convert the converted URL in the file into a URL carrying navigation state information.

With the method and the apparatus according to the embodiments of the present invention, the page flow developed by the developer can be automatically normalized into the portlet which is easier to be shared between different applications and integrated with an existing portal applications, so that the developer can focus on development of the page flow while achieving user experience and advantages specific to the portlet.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for normalizing a page flow into a portlet, the method comprising:
    generating, by one or more processors, at least two portlets based on at least two pages in the page flow, wherein the page flow includes multiple webpages that are linked together through navigation control to execute a specific business logic, wherein pages that are functionally dependent upon one another are assigned to a same portlet, and wherein pages that are functionally independent of one another are assigned to different portlets;
    building, by one or more processors, at least one of an intra-portlet action and an inter-portlet action for at least one portlet from the at least two portlets, wherein the intra-portlet action is based on a linking relationship between two pages within the same portlet, and wherein the inter-portlet action is based on a linking relationship between two pages that are in different portlets; and
    modifying, by one or more processors, a Uniform Resource Locator (URL) in the at least one portlet from the at least two portlets based on whether pages within the at least one portlet incur the intra-portlet action, wherein the URL indicates a relative path in the at least one portlet that incurs the intra-portlet action, wherein modifying the URL in the at least one portlet includes converting the URL into a URL indicating an absolute path in the portlet in response to the at least one portlet incurring the intra-portlet action, wherein the converting includes attaching at least one root path in the at least one portlet to the URL in response to the at least one portlet incurring the intra-portlet action, wherein the modifying the URL in the at least one portlet includes modifying, by one or more processors, the URL in the at least one portlet based on a type of the URL; and wherein the modifying the URL in the at least one portlet based on the type of the URL includes:
    in response to the URL corresponding to a link in a page and an object of the link being a new window or a new tab, converting, by one or more processors, the URL into a URL carrying navigation state information that describes a layout of a page where the at least one portlet is currently located; and in response to the URL being located in a JavaScript file, converting, by one or more processors, a URL indicating a relative path in the JavaScript file into a URL indicating an absolute path of the URL found in the JavaScript file.

2. The method according to claim 1, wherein the generating the at least two portlets based on the at least two pages in the page flow includes:
    determining, by one or more processors, one page, which is to be generated into each portlet, in the at least two pages; and
    generating, by one or more processors, the at least two portlets based on the one page, which is to be generated into each portlet.

3. The method according to claim 2, further comprising:
    in response to the one page in the at least two pages being linked to another independent page, determining, by one or more processors, that the one page and the another independent page are generated into two portlets; and
    in response to the one page in the at least two pages being linked to another page for overlaying the one page, determining, by one or more processors, that the one page and the another page are generated into a same portlet.

4. The method according to claim 1, wherein the building at least one of an intra-portlet action and an inter-portlet action for the at least one portlet includes:
    building, by one or more processors, the intra-portlet action based on a linking relationship among pages included in one portlet; and
    building, by one or more processors, the inter-portlet action based on a linking relationship among a plurality of pages included in a plurality of portlets, respectively.

5. The method according to claim 1, further comprising:
    modifying, by one or more processors, the URL in the at least one portlet from the at least two portlets based on a type of the converted URL.

6. The method of claim 1, wherein the page flow comprises a set of pages and a third page, wherein the set of pages comprises a first page and a second page, wherein the second page jumps to the third page in response to an event described in the second page, and wherein the method further comprises:
    generating, by one or more processors, a first portlet for the set of pages;
    generating, by one or more processors, a second portlet for the third page; and
    linking, by one or more processors, the first portlet to the second portlet by the event described in the second page.

7. A computer system comprising:
    a processor; and
    a memory coupled to the processor, the memory comprising instructions that, when executed by the processor, cause the system to:
    generate at least two portlets based on at least two pages in a page flow, wherein the page flow includes multiple webpages that are linked together through navigation control to execute a specific business logic, wherein pages that are functionally dependent upon one another are assigned to a same portlet, and wherein pages that are functionally independent of one another are assigned to different portlets;
    build at least one of an intra-portlet action and an inter-portlet action for at least one portlet from the at least two portlets, wherein the intra-portlet action is based on a linking relationship between two pages within the same portlet, and wherein the inter-portlet action is based on a linking relationship between two pages that are in different portlets; and modify a Uniform Resource Locator (URL) of the at least one portlet based on whether pages within the at least one portlet incur the intra-portlet action, wherein the URL indicates a relative path in the at least one portlet that incurs the intra-portlet action, wherein modifying the URL in the at least one portlet includes converting the URL into a URL indicating an absolute path in the portlet in response to the at least one portlet incurring the intra-portlet action, wherein the converting includes attaching at least one root path in the at least one portlet to the URL in response to the at least one portlet incurring the intra-portlet action, wherein the modifying the URL in the at least one portlet includes modifying the URL in the at least one portlet based on a type of the URL; and wherein the modifying the URL in the at least one portlet based on the type of the URL includes: in response to the URL corresponding to a link in a page and an object of the link being a new window or a new tab, converting the URL into a URL carrying navigation state information that describes a layout of a page where the at least one portlet is currently located; and in response to the URL being located in a JavaScript file, converting a URL indicating a relative path in the JavaScript file into a URL indicating an absolute path of the URL found in the JavaScript file.

8. The computer system of claim 7, wherein the instructions, when executed by the processor, further cause the computer system to:
determine one page, which is to be generated into each portlet, in the at least two pages; and
generate the at least two portlets based on the one page which is determined to be generated into each portlet.

9. The computer system according to claim 8, wherein the instructions, when executed by the processor, further cause the computer system to:
in response to the one page in the at least two pages being linked to another independent page, determine that the one page and the another independent page are generated into two portlets, and in response to the one page in the at least two pages being linked to another page for overlaying the one page, determine that the one page and the another page are generated into a same portlet.

10. The computer system of claim 7, wherein the instructions, when executed by the processor, further cause the computer system to:
build the intra-portlet action based on a linking relationship among pages included in one portlet; and
build the inter-portlet action based on a linking relationship among a plurality of pages included in a plurality of portlets, respectively.

11. The computer system of claim 7, wherein the instructions, when executed by the processor, further cause the computer system to:
modify the URL in the at least one portlet from the at least two portlets based on a type of the URL.

12. A computer program product for normalizing a page flow into a portlet, the computer program product comprising a computer readable storage medium having program code embodied therewith, the program code readable and executable by a processor to perform a method comprising:
generating at least two portlets based on at least two pages in the page flow, wherein the page flow includes multiple webpages that are linked together through navigation control to execute a specific business logic, wherein pages that are functionally dependent upon one another are assigned to a same portlet, and wherein pages that are functionally independent of one another are assigned to different portlets;
building at least one of an intra-portlet action and an inter-portlet action for at least one portlet from the at least two portlets, wherein the intra-portlet action is based on a linking relationship between two pages within the same portlet, and wherein the inter-portlet action is based on a linking relationship between two pages that are in different portlets; and
modifying a Uniform Resource Locator (URL) in the at least one portlet based on whether pages within the at least one portlet incur the intra-portlet action, wherein the URL indicates a relative path in the at least one portlet that incurs the intra-portlet action, wherein modifying the URL in the at least one portlet includes converting the URL into a URL indicating an absolute path in the portlet in response to the at least one portlet incurring the intra-portlet action, wherein the converting includes attaching at least one root path in the at least one portlet to the URL in response to the at least one portlet incurring the intra-portlet action, wherein the modifying the URL in the at least one portlet includes modifying the URL in the at least one portlet based on a type of the URL; and wherein the modifying the URL in the at least one portlet based on the type of the URL includes: in response to the URL corresponding to a link in a page and an object of the link being a new window or a new tab, converting, by one or more processors, the URL into a URL carrying navigation state information that describes a layout of a page where the at least one portlet is currently located; and in response to the URL being located in a JavaScript file, converting a URL indicating a relative path in the JavaScript file into a URL indicating an absolute path of the URL found in the JavaScript file.

13. The computer program product according to claim 12, wherein the method further comprises:
determining one page, which is to be generated into each portlet, in the at least two pages; and
generating the at least two portlets based on the one page, which is to be generated into each portlet.

14. The computer program product according to claim 13, wherein the method further comprises:
in response to the one page in the at least two pages being linked to another independent page, determining that the one page and the another independent page are generated into two portlets;
in response to the one page in the at least two pages being linked to another page for overlaying the one page, determining that the one page and the another page are generated into a same portlet.

15. The computer program product according to claim 12, wherein the method further comprises:
building the intra-portlet action based on a linking relationship among pages included in one portlet; and
building the inter-portlet action based on a linking relationship among a plurality of pages included in a plurality of portlets, respectively.

* * * * *